United States Patent [19]

Ong et al.

[11] Patent Number: 5,491,228

[45] Date of Patent: Feb. 13, 1996

[54] PREPARATIVE PROCESSES FOR DIHYDROXYGERMANIUM PHTHALOCYANINE

[75] Inventors: Beng S. Ong; Cheng-Kuo Hsiao, both of Mississauga, Canada

[73] Assignee: Xerox Corporation, Stamford, Conn.

[21] Appl. No.: 228,619

[22] Filed: Apr. 18, 1994

[51] Int. Cl.$^6$ .................................................. C09B 67/50
[52] U.S. Cl. ............................................ 540/128; 540/122
[58] Field of Search ....................................... 540/122, 128

[56] References Cited

U.S. PATENT DOCUMENTS

| | | | |
|---|---|---|---|
| 4,557,989 | 12/1985 | Branston et al. | 430/59 |
| 5,153,313 | 10/1992 | Kazmaier et al. | 540/138 |
| 5,166,339 | 11/1992 | Duff et al. | 540/141 |
| 5,360,475 | 11/1994 | Nukada et al. | 540/128 |

Primary Examiner—Mukund J. Shah
Assistant Examiner—Pavanaram K. Sripada
Attorney, Agent, or Firm—E. O. Palazzo

[57] ABSTRACT

A process for the preparation of dihydroxygermanium phthalocyanine, polymorphic Type III, which comprises treating dihalogermanium phthalocyanine or dialkoxygermanium phthalocyanine with a strong acid, followed by treatment with water, optionally washing with a dilute aqueous base and water, and subsequently optionally admixing with a solvent mixture comprised of a strong organic acid and aprotic organic solvent.

19 Claims, 3 Drawing Sheets

FIG. 3

PREPARATIVE PROCESSES FOR DIHYDROXYGERMANIUM PHTHALOCYANINE

BACKGROUND OF THE INVENTION

This invention is generally directed to germanium phthalocyanines and processes for the preparation thereof and, more specifically, the present invention is directed to processes for the preparation of dihydroxygermanium phthalocyanine. In embodiments, the process of the present invention comprises the formation of a novel polymorph of dihydroxygermanium phthalocyanine, which is herein referred to as Type III dihydroxygermanium phthalocyanine. This polymorph can be obtained, for example, by acid hydrolysis of dihalogermanium phthalocyanine or dialkoxygermanium phthalocyanine, followed by treatment with an organic base such as tertiary amine, and washing with aprotic organic solvent such as alcohol. Alternatively, the Type III dihydroxygermanium phthalocyanine can also be prepared by polymorphic conversion of other polymorphs of dihydroxygermanium phthalocyanine by appropriate physical or chemical treatment. For example, Type III dihydroxygermanium phthalocyanine can be converted to Type III polymorph by stirring Type I in a mixed solvent medium of trifluoroacetic acid and methanol, while Type II polymorph provides Type III polymorph when treated with methanol. Type III dihydroxygermanium phthalocyanine can be selected as organic photogenerator pigments in layered photoresponsive imaging members with charge transport layers, such as infrared light responsive pigments, especially hole transport layers containing hole transport molecules such as known tertiary aryl amines. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductive imaging members can be selected for a number of different known imaging and printing processes including, for example, electrophotographic imaging processes, especially xerographic imaging and printing processes wherein negatively charged or positively charged images are rendered visible using toner compositions of appropriate charge polarity. In general, the imaging members are sensitive in the wavelength regions of from about 550 to about 800 nanometers, thus diode lasers can be selected as the light source.

Dihydroxygermanium phthalocyanine is a known infrared photoresponsive photogenerator pigment, and can be prepared from dichlorogermanium phthalocyanine by treatment with concentrated sulfuric acid followed by hydrolysis and washing with water or aqueous base as disclosed, for example, in U.S. Pat. No. 4,557,989, the disclosure of which is totally incorporated herein by reference. The resulting dihydroxygermanium phthalocyanine has been shown to exhibit a crystalline polymorph (herein referred to as Type I) whose solid state absorption spectrum extends from about 500 to over 1,000 nanometers. Layered photoresponsive imaging members using Type I dihydroxygermanium phthalocyanine generally exhibit high photosensitivities in the 600 to 900 nanometers spectral region, however, the dark decay thereof is generally high. Dark decay values of over 100 volts per second are typical of these imaging members. Photoresponsive imaging members with Type III dihydroxygermanium phthalocyanine photogenerator pigment as prepared with the processes of the present invention have substantially improved characteristics such as lower dark decay, higher photosensitivity, better cyclic stability, and the like as illustrated herein.

In Konica Japanese 64-17066/89, there is disclosed, for example, the use of a new crystal modification of titanyl phthalocyanine (TiOPc) prepared from alpha-type titanyl phthalocyanine (Type II) by milling it in a sand mill with salt and polyethylene glycol. This publication also discloses that this new polymorph differs from alpha-type pigment in its light absorption and shows a maximum absorbance at 817 nanometers while the alpha-type exhibits a maximum at 830 nanometers. The Konica publication also discloses the use of this new form of TiOPc in a layered electrophotographic device having high photosensitivity at an exposure radiation of 780 nanometers. Further, this new polymorph of TiOPc is also described in U.S. Pat. No. 4,898,799 and in a paper presented at the Annual Conference of Japan Hardcopy in July 1989. In this paper, this same new polymorph is referred to as Type Y, and reference is also made to Types I, II, and III as A, B, and C, respectively.

Layered photoresponsive imaging members have been described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is substantially incapable of transporting for any significant distance injected charge carriers generated by the photoconductive particles.

The use of certain perylene pigments as photoconductive substances is also known. There is thus described in Hoechst European Patent Publication 0040402, DE3019326, filed May 21, 1980, the use of N,N'-disubstituted perylene-3,4, 9,10-tetracarboxyldiimide pigments as photoconductive substances. Specifically, there is, for example, disclosed in this publication N,N'-bis(3-methoxypropyl)perylene-3,4,9, 10-tetracarboxyldiimide dual layered negatively charged photoreceptors with improved spectral response in the wavelength region of 400 to 700 nanometers. A similar disclosure is revealed in Ernst Gunther Schlosser, *Journal of Applied Photographic Engineering*, Vol. 4, No. 3, page 118 (1978). There are also disclosed in U.S. Pat. No. 3,871,882 photoconductive substances comprised of specific perylene-3,4, 9,10-tetracarboxylic acid derivative dyestuffs. In accordance with the teachings of this patent, the photoconductive layer is preferably formed by vapor depositing the dyestuff in a vacuum. Also, there is specifically disclosed in this patent dual layer photoreceptors with perylene-3,4,9,10-tetracarboxylic acid diimide derivatives, which have spectral response in the wavelength region of from 400 to 600 nanometers. Also, in U.S. Pat. No. 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with a perylene pigment photogenerating component. Both of the aforementioned patents disclose an aryl amine component as a hole transport layer.

In copending application U.S. Ser. No. 537,714, the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance with low dark decay characteristics and high photosensitivity, particularly in comparison to several prior art imaging members prepared by solution coating or spray coating, reference for example, U.S. Pat. No. 4,429,029 mentioned hereinbefore.

In U.S. Pat. No. 5,153,313, the disclosure of which is totally incorporated herein by reference, there is illustrated a process for the preparation of phthalocyanine composites which comprises adding a metal-free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

In U.S. Pat. No. 5,166,339, the disclosure of which is totally incorporated herein by reference, there is illustrated a process for the preparation of titanyl phthalocyanine which comprises the reaction of titanium tetrapropoxide with diiminoisoindolene in N-methylpyrrolidone solvent to provide Type I, or β-type titanyl phthalocyanine as determined by X-ray powder diffraction analysis; dissolving the resulting titanyl phthalocyanine in a mixture of trifluoroacetic acid and methylene chloride; adding the resulting mixture to a stirred organic solvent, such as methanol, or to water; separating the resulting precipitate by, for example, vacuum filtration through a glass fiber paper in a Buchner funnel; and washing the titanyl phthalocyanine product. Examples of titanyl phthalocyanine reactants that can be selected in effective amounts of, for example, from about 1 weight percent to about 40 percent by weight of the trifluoroacetic acidic solvent mixture include known available titanyl phthalocyanines; titanyl phthalocyanines synthesized from the reaction of titanium halides such as titanium trichloride, titanium tetrachloride or tetrabromide, titanium tetraalkoxides such as titanium tetra-methoxide, -ethoxide, -propoxide, -butoxide, oisopropoxide and the like; and other titanium salts with compounds such as phthalonitrile and diiminoisoindolene in solvents such as 1-chloronaphthalene, quinoline, N-methylpyrrolidone, and alkylbenzenes such as xylene at temperatures of from about 120 to about 300° C; specific polymorphs of titanyl phthalocyanine such as Type I, II, III, and IV, the preparation of which, for example, is described in the literature; or any other suitable polymorphic form of TiOPc; substituted titanyl phthalocyanine pigments having from 1 to 16 substituents attached to the outer ring of the compound, said substituent being, for example, halogens such as chloro-, bromo-, iodo- and fluoro-, alkyls with from 1 to about 6 carbon atoms such as methyl-, ethyl-, propyl-, isopropyl-, butyl-, pentyl-, and hexyl-; nitro, amino, alkoxy and alkylthio, such as methoxy-, ethoxy- and propylthio-groups; and mixtures thereof.

Disclosed in U.S. Pat. No. 5,164,493 is a process for the preparation of titanyl phthalocyanine Type I which comprises the addition of titanium tetraalkoxide in a solvent to a mixture of phthalonitrile and a diiminoisoindolene, followed by heating. The disclosure of this patent is totally incorporated herein by reference. Disclosed in U.S. Pat. 5,189,156 is a process for the preparation of titanyl phthalocyanine Type I which comprises the reaction of titanium tetraalkoxide and diiminoisoindolene in the presence of a halonaphthalene solvent; and disclosed in U.S. Pat. No. 5,206,359 is a process for the preparation of titanyl phthalocyanine which comprises the treatment of titanyl phthalocyanine Type X with a halobenzene, the disclosures of which are totally incorporated herein by reference.

In U.S. Pat. No. 5,407,766 and copending application U.S. Ser. No. 169,486, the disclosures of which are totally incorporated herein by references, there is illustrated a process for the preparation of hydroxygallium phthalocyanine which comprises the synthesis of a precursor halogallium phthalocyanine by the reaction of a diiminoisoindolene with gallium acetylacetonate; hydrolysis thereof to hydroxygallium phthalocyanine; and conversion of the resulting hydroxygallium phthalocyanine obtained to Type V hydroxygallium phthalocyanine by contacting said resulting hydroxygallium phthalocyanine with an organic solvent; and a process for the preparation of hydroxygallium phthalocyanine which comprises hydrolysis of halogallium phthalocyanine precursor to a hydroxygallium phthalocyanine, and conversion of said resulting hydroxygallium phthalocyanine to Type V hydroxygallium phthalocyanine by contacting said resulting hydroxygallium phthalocyanine with an organic solvent; and wherein said precursor halogallium phthalocyanine is obtained by the reaction of gallium halide with diiminoisoindolene in an organic solvent.

The disclosures of all of the aforementioned publications, laid open applications, copending applications and patents are totally incorporated herein by reference.

SUMMARY OF THE INVENTION

It is an object of the present invention to provide processes for the preparation of dihydroxygermanium phthalocyanine and imaging members thereof with many of the advantages illustrated herein.

Another object of the present invention relates to the provision of improved layered photoresponsive imaging members with photosensitivity to near infrared radiations.

It is yet another object of the present invention to provide simple and economical processes for the preparation of Type III dihydroxygermanium phthalocyanine.

In a further object of the present invention there are provided processes for the preparation of Type III dihydroxygermanium phthalocyanine from dihalogermanium phthalocyanine or dialkoxygermanium phthalocyanine by stirring in concentrated sulfuric acid, followed by treatment with water, washing with an organic base such as amine, and finally washing with an alcohol such as methanol.

Moreover, in another object of the present invention there are provided processes for the direct conversion of other polymorphs of dihydroxygermanium phthalocyanine such as Type I and Type II polymorphs to the Type III or Type IV polymorph with improved photoresponsive characteristics by treatment with an appropriate organic solvent system.

A further object of the present invention relates to the preparation of electrically pure Type III dihydroxygermanium phthalocyanine in desirable yields, and its use thereof in electrophotographic processes.

In still a further object of the present invention there are provided photoresponsive imaging members with an aryl amine hole transport layer, and a photogenerator layer comprised of Type III dihydroxygermanium phthalocyanine pigment components obtained by the processes illustrated herein.

Figure 1:
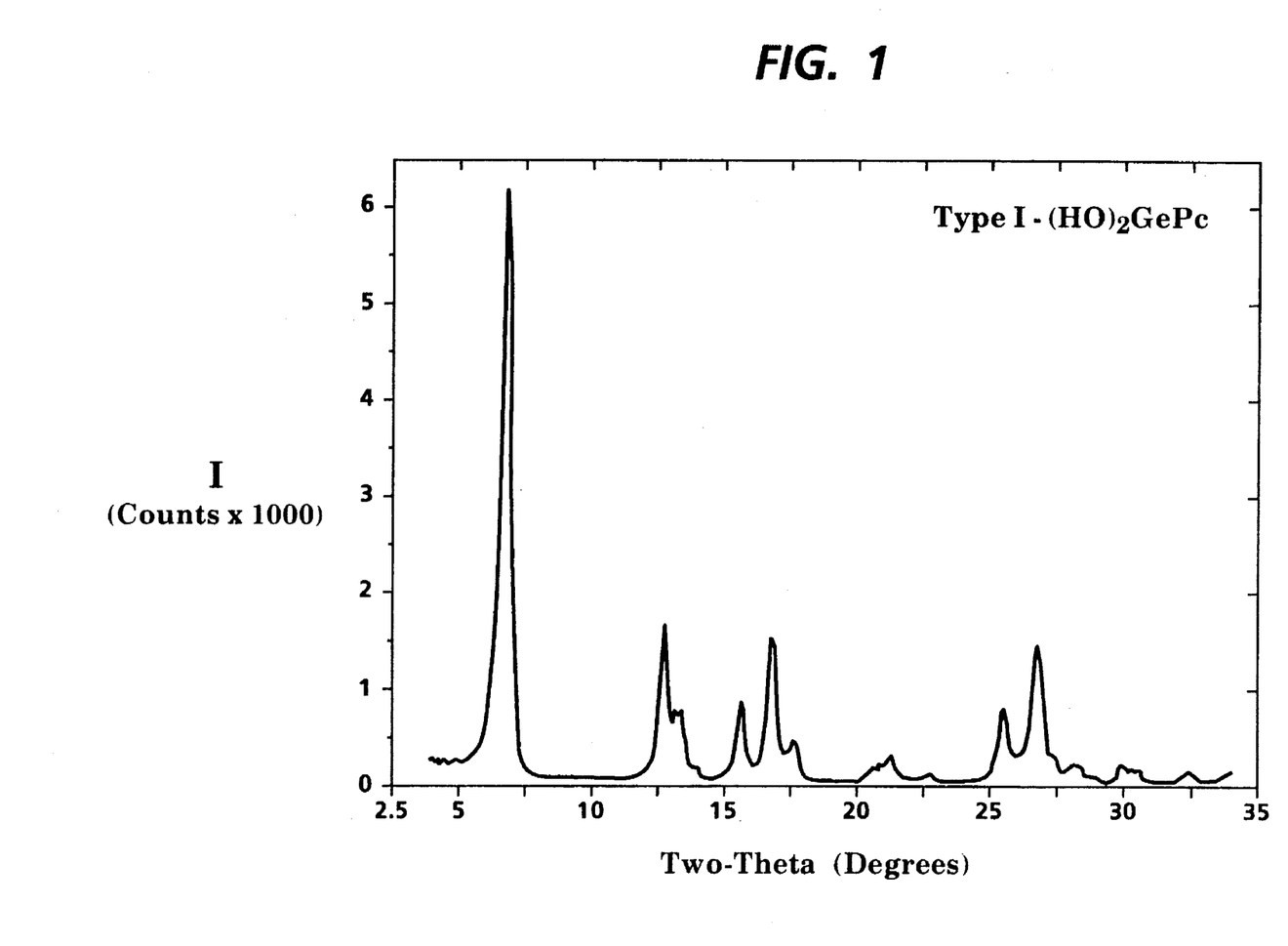
FIGS. 1, 2 and 3 are, respectively, XRPD's for Type I, Type II, and Type III polymorphs of dihydroxygermanium phthalocyanine.
Figure 2:
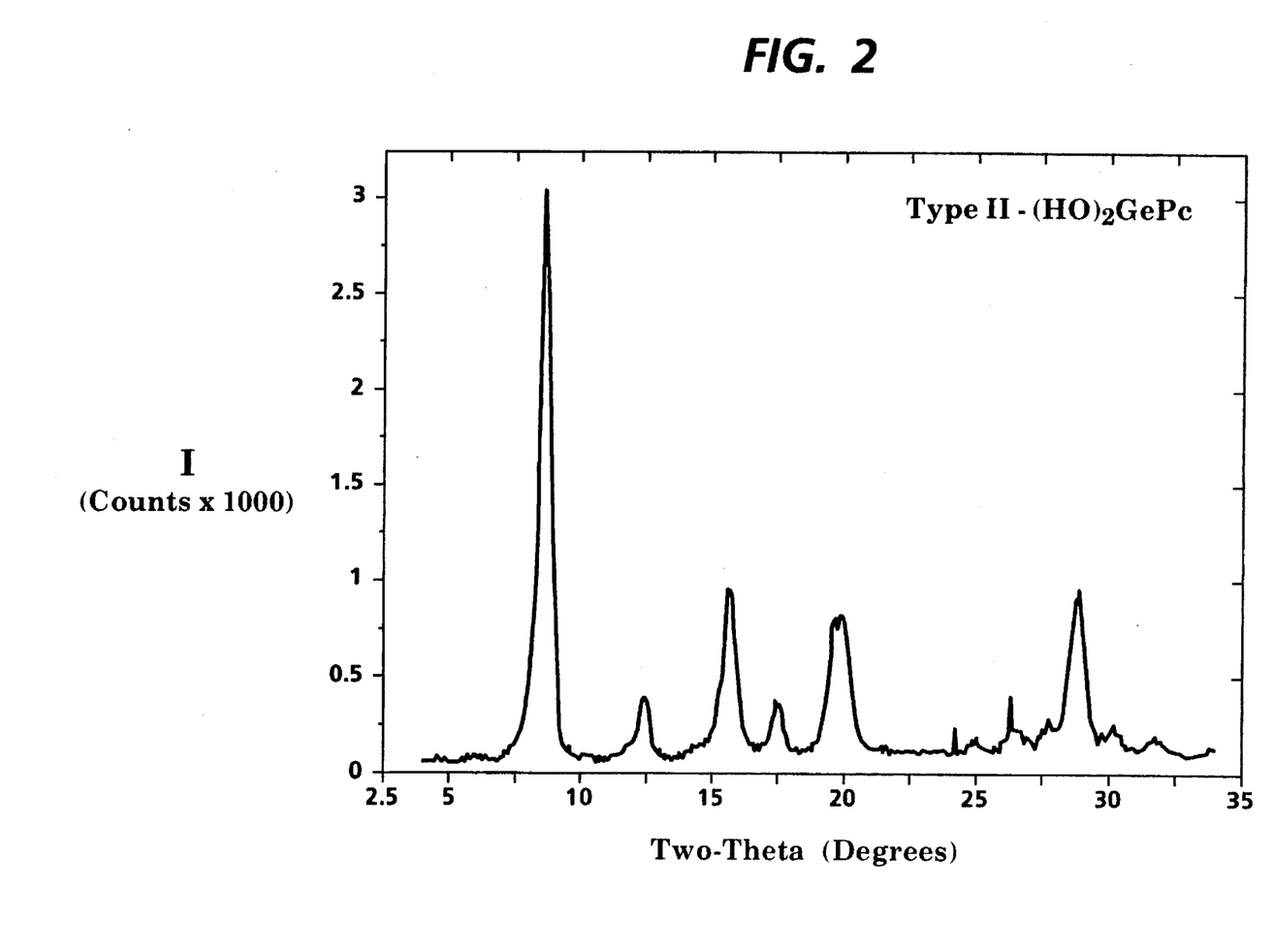
Figure 3:
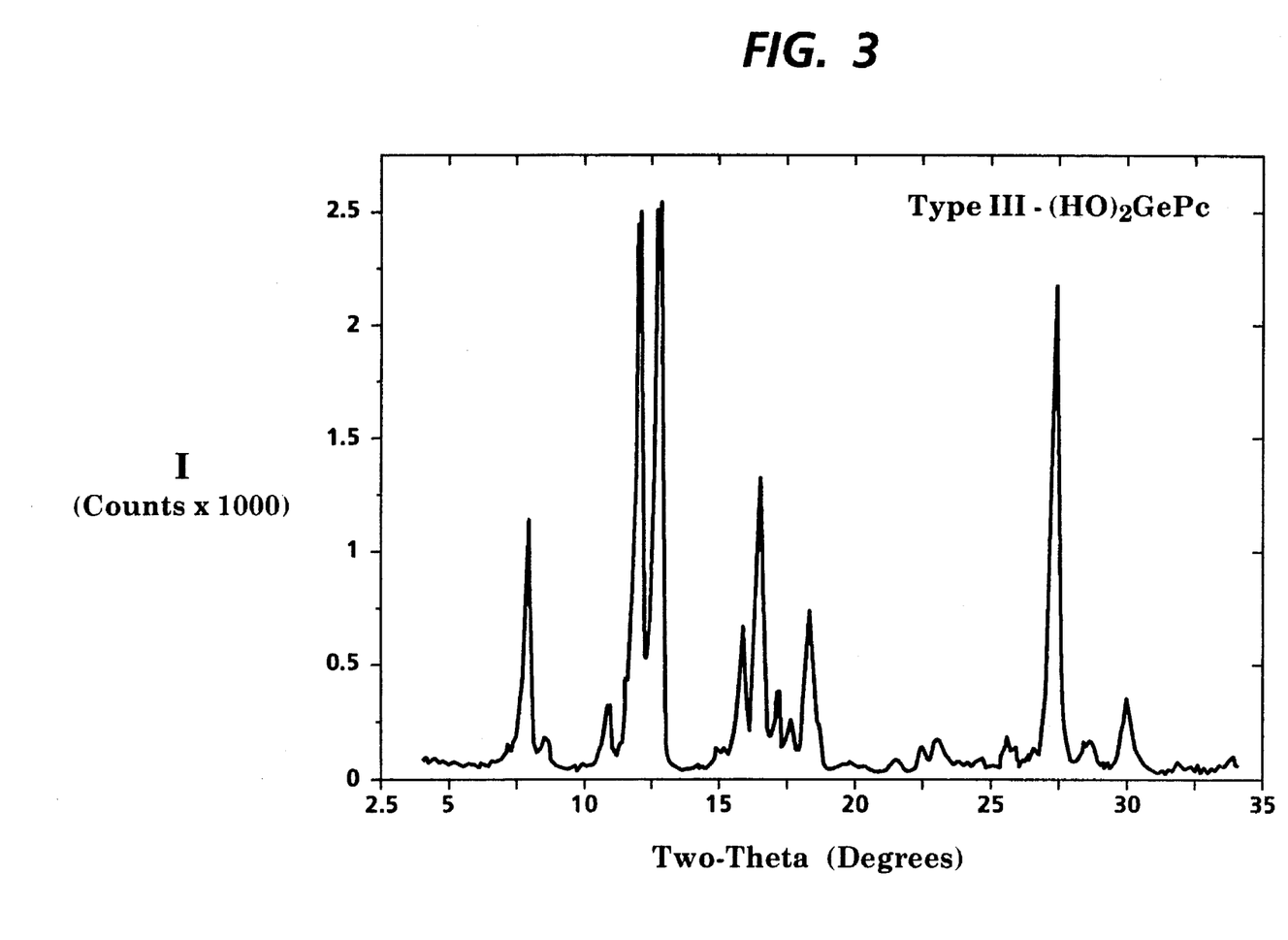

These and other objects of the present invention can be accomplished in embodiments thereof by the provision of processes for the preparation of dihydroxygermanium phthalocyanine, especially Type III, and photoresponsive imaging members thereof. More specifically, in embodiments of the present invention there are provided processes for the preparation of Type III dihydroxygermanium phthalocyanine, which comprise the reaction of phthalonitrile or diiminoisoindolene with tetrahalogermanium such as tetrachlorogermanium or tetraalkoxygermanium such as tetraethoxygermanium in a suitable solvent, reaction of the resultant dihalogermanium phthalocyanine or dialkoxygermanium phthalocyanine intermediate with concentrated sulfuric acid, precipitating the dihydroxygermanium phthalocyanine product from water, neutralizing the absorbed acid with an organic base, such as amine, and washing the dihydroxygermanium phthalocyanine pigment with an alcohol. Another embodiment of the present invention relates to the preparation of Type III dihydroxygermanium phthalocyanine by direct polymorphic conversion from other polymorphs, such as Type I polymorph, by stirring in a mixed solvent system of a strong organic acid and an alcohol, such as trichloroacetic acid and methanol, or Type III can be prepared from the Type II polymorph by stirring in an alcohol such as methanol. The different polymorphic forms of dihydroxygermanium phthalocyanine can be readily identified by various known analytical methods including Xoray powder diffraction analysis (XRPD). FIGS. 1, 2 and 3 are, respectively, the XRPD patterns of Type I, II and III polymorphs of dihydroxygermanium phthalocyanine.

In embodiments, the present invention is directed to a process for the preparation of dihydroxygermanium phthalocyanine, polymorphic Type III, which comprises treating dihalogermanium phthalocyanine or dialkoxygermanium phthalocyanine with a strong acid, followed by treatment with water, optionally washing with a dilute aqueous base and water, and subsequently optionally admixing with a solvent mixture comprised of a strong organic acid and aprotic organic solvent; a process for the preparation of Type III dihydroxygermanium phthalocyanine, which comprises admixing dihalogermanium phthalocyanine or dialkoxygermanium phthalocyanine with a strong acid, followed by contact with water, and then washing with an organic base and aprotic solvent; a process for the preparation of Type III dihydroxygermanium phthalocyanine by direct polymorphic conversion from Type I dihydroxygermanium phthalocyanine by contacting a solvent mixture of a strong organic acid and aprotic organic solvent, followed by optional washing with said aprotic organic solvent; and a process for the preparation of Type III dihydroxygermanium phthalocyanine by direct polymorphic conversion from Type II dihydroxygermanium phthalocyanine by contacting said phthalocyanine with aprotic solvent, followed by washing with said aprotic solvent, and drying.

Specifically, embodiments of the present invention are directed to processes for the preparation of Type III polymorph of dihydroxygermanium phthalocyanine by reacting 4 molar equivalents of phthalonitrile or diiminoisoindolene with one molar equivalent of tetrahalogermanium such as tetrachlorogermanium in a suitable solvent such as chloronaphthalene, N-methyl pyrrolidone, quinoline, or dimethylformamide at a temperature of from about 100° C. to over 200° C. under an inert atmosphere for about 1 hour to about 8 hours. After the reaction, the reaction mixture is cooled down to about 100° to 150° C. and filtered. The collected dichlorogermanium phthalocyanine intermediate is washed several times with boiling dimethylformamide and then with hot methanol, and is dried in vacuo at about 75° C. To convert the resulting dichlorogermanium phthalocyanine to dihydroxygermanium phthalocyanine Type III, 1 part by weight of dichlorogermanium phthalocyanine is added in small portions to about 10 to 50 parts by weight of concentrated sulfuric acid over a period of 15 to 30 minutes, and the mixture is stirred at room temperature for about 1 to about 4 hours. The resulting solution is then added slowly to crushed ice or ice-cold water over a period of 15 minutes to 1 hour. The precipitated dihydroxygermanium phthalocyanine pigment is filtered, and washed several times with a dilute aqueous base, such as sodium hydroxide about 100 to about 500 milliliters, pyridine and the like, and then water, about 100 to about 600 milliliters, and dried in vacuo. The pigment obtained is a Type I dihydroxygermanium phthalocyanine, and it is converted to the Type III polymorph by slurrying in a suitable mixed solvent medium of a strong organic acid and aprotic organic component solvent for about 5 minutes to about 1 hour, filtered, and dried. Both the X-ray powder diffraction pattern and solid state absorption spectrum show that the dihydroxygermanium phthalocyanine prepared is the Type III polymorphic form.

As a mixed solvent medium for the polymorphic conversion, a mixture of a strong organic acid such as a trihaloacetic acid, including trifluoroacetic acid or trichloroacetic acid, and aprotic organic solvent, such as an aliphatic alcohol, wherein aliphatic is alkyl with, for example, 1 to about 25 carbon atoms, including methanol, ethanol, propanol, butanol, and the like can be selected. A ratio of from about 1 to about 50 parts of strong acid, such as trifluoroacetic acid, to about 100 parts of aprotic organic solvent, such as methanol, can be effectively utilized in the conversion process. In an embodiment of the present invention, a preferred solvent mixture is comprised of trifluoroacetic acid and methanol in a ratio of from about 5 parts of acid to about 95 parts of methanol to about 25 parts of acid to about 75 parts of methanol.

Another embodiment of the present invention relates to the preparation of Type III dihydroxygermanium phthalocyanine using the tetraalkoxygermanium precursor, such as tetraethoxygermanium, via similar processes as described above with the exception that tetraalkoxygermanium is utilized in place of tetrahalogermanium. An additional embodiment of the present invention provides an efficient polymorphic conversion procedure whereby other polymorphs of dihydroxygermanium phthalocyanine, such as the Type II polymorph, can be readily converted to Type III polymorph. This process involves simple stirring of the Type II dihydroxygermanium phthalocyanine in aprotic organic solvent such as alcohol, preferably methanol, for 5 minutes to about 1 hour. In general, 1 part of Type II dihydroxygermanium phthalocyanine to about 10 to 100 parts of alcohol can be utilized, and generally from about 5 minutes to about 30 minutes are selected to accomplish the conversion at room temperature.

Numerous different layered photoresponsive imaging members with the Type III dihydroxygermanium phthalocyanine pigments obtained by the processes of the present invention can be fabricated. In embodiments, thus the layered photoresponsive imaging members are comprised of a supporting substrate, a charge transport layer, especially an aryl amine hole transport layer, and situated therebetween a photogenerator layer comprised of the dihydroxygermanium phthalocyanine photogenerating pigment, especially the Type III polymorph. Other embodiments of the present invention are directed to positively charged layered photoresponsive imaging members comprised of a supporting substrate, a charge transport layer, especially an aryl amine hole transport layer, and as a top overcoating Type III dihydroxygermanium phthalocyanine obtained with the processes of the present invention. Moreover, there is provided in accordance with the present invention an improved negatively charged photoresponsive imaging member comprised of a supporting substrate, a thin adhesive layer, a Type III dihydroxygermanium phthalocyanine photogenerator obtained by the processes of the present invention dispersed in a polymer binder such as poly(vinyl butyral), and as a top layer aryl amine hole transporting molecules dispersed in a polymer binder such as polycarbonate.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is accomplished to provide a final coating thickness of from 0.01 to about 30 microns after it has dried. The fabrication conditions for a given layer can be tailored to achieve optimum performance and cost in the final device.

Imaging members of the present invention are useful in various electrostatographic imaging and printing systems, particularly those conventionally known as xerographic processes. Specifically, the imaging members of the present invention are useful in xerographic imaging processes wherein the Type III dihydroxygermanium phthalocyanine pigments absorb light of a wavelength of from about 550 nanometers to about 800 nanometers. In these known processes, electrostatic latent images are initially formed on the imaging member followed by development, and thereafter transferring the image to a suitable substrate.

Moreover, the imaging members of the present invention can be selected for electronic printing processes with gallium arsenide light emitting diode (LED) arrays which typically function at wavelengths of from 660 to about 830 nanometers.

The xerographic electrical properties of the imaging members can be determined by known means, including as indicated herein electrostatically charging the surfaces thereof with a corona discharge source until the surface potentials, as measured by a capacitively coupled probe attached to an electrometer, attained an initial value $V_0$ of about −800 volts. After resting for 0.5 second in the dark, the charged members attain a surface potential of $V_{ddp}$, dark development potential. Each member was then exposed to light from a filtered Xenon lamp with a XBO 150 watt bulb, thereby inducing a photodischarge which resulted in a reduction of surface potential to a $V_{bg}$ value, background potential. The dark decay in volts/second was calculated as $(V_o-V_{ddp})/0.5$. The percent of photodischarge was calculated as 100 percent $(V_{ddp}-V_{bg})/V_{ddp}$. The desired wavelength and energy of the exposed light was determined by the type of filters placed in front of the lamp. The broad band white light (400 to 700 nanometers) photosensitivity of these imaging members was measured by using an infrared cut-off filter whereas the monochromatic light photosensitivity was determined using a narrow band-pass filter. The photosensitivity of the imaging members is usually provided in terms of the amount of exposure energy in ergs/cm$^2$, designated as $E_{1/2}$, required to achieve 50 percent photodischarge from the dark development potential. The higher the photosensitivity, the smaller is the $E_{1/2}$ value.

BRIEF DESCRIPTION OF THE DRAWINGS

For a better understanding of the present invention and further features thereof, reference is made to the following detailed description of various preferred embodiments wherein.

One negatively charged photoresponsive imaging member of the present invention is comprised of a supporting substrate, an adhesive layer comprised, for example, of a polyester 49,000 available from Goodyear Chemical, a photogenerator layer comprised of Type III dihydroxygermanium phthalocyanine obtained with the process of the present invention, optionally dispersed in an inactive polymer binder, and a hole transport layer thereover comprised of N,N'-diphenyl-N,N'-bis(3-methyl phenyl)-1,1'-biphenyl-4,4'-diamine dispersed in a polycarbonate binder.

An illustrative positively charged photoresponsive imaging member of the present invention is depicted. It is comprised of a substrate, thereover a charge transport layer comprised of N,N'-diphenyl-N,N'-bis(3-methyl phenyl)-1,1'-biphenyl-4,4'-diamine dispersed in a polycarbonate binder, and a top photogenerator layer comprised of Type III dihydroxygermanium phthalocyanine obtained with the process of the present invention optionally dispersed in an inactive polymer binder.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR® a commercially available polymer, MYLAR® containing titanium, a layer of an organic or inorganic material having a semiconductive surface layer, such as indium tin oxide, or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anti-curl layer, such as for example polycarbonate materials commercially available as MAKROLON®.

The thickness of the substrate layer depends on many factors, including economical considerations, thus this layer may be of substantial thickness, for example over 3,000 microns, or of minimum thickness providing there are no adverse effects on the system. In embodiments, the thickness of this layer is from about 75 microns to about 300 microns.

With further regard to the imaging members, the photogenerator layer in embodiments is comprised of the Type III dihydroxygermanium phthalocyanine obtained with the processes of the present invention dispersed in resinous binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the phthalocyanine photogenerator composition is present in an amount of from about 5 percent to about 100 percent by volume. In embodiments, this layer is of a thickness of from about 0.25 micron to about 1 micron when the photogenerator composition is present in this layer in an amount of 30 to 75 percent by volume. The maximum thickness of this layer in an embodiment is dependent primarily upon factors, such as photosensitivity, electrical properties and mechanical considerations. The photogenerator layer can be fabricated by coating a dispersion of Type III dihydroxygermanium phthalocyanine obtained with the processes of the present invention in a suitable solvent with an optional polymer binder material. The dispersion can be prepared by mixing and/or milling the Type III dihydroxygermanium phthalocyanine in an equipment such as paint shakers, ball mills, sand mills and attritors. Common grinding media such as glass beads, steel balls or ceramic beads may be used in this equipment. The polymer binder material may be selected from a number of known polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinylalcohol), polyacrylonitrile, polystyrene, and the like. In embodiments of the present invention, it is desirable to select a solvent that does not adversely affect the integrity of the previously coated layers of the device. Examples of solvents useful for coating the dispersions to form a photogenerator layer are ketones, alcohols, aromatic hydrocarbons, halogenated aliphatic hydrocarbons, ethers, amines, amides, esters, and the like. Specific examples of solvents include cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate, methoxyethyl acetate, and the like.

The coating of the dispersion in embodiments of the present invention can be accomplished with spray, dip or wire-bar methods such that the final dry thickness of the charge generator layer is from 0.01 to 30 microns and preferably from 0.1 to 15 microns after being dried at 40° to 150° C. for 5 to 90 minutes.

Illustrative examples of polymeric binder materials present in amounts of from about 45 to about 99 percent in embodiments that can be selected for the photogenerator pigment include those polymers as disclosed in U.S. Pat. No. 3,121,006, the disclosure of which is totally incorporated herein by reference, polyvinyl carbazole, and the like.

As adhesives usually in contact with the supporting substrate, there can be selected various known substances inclusive of polyesters, polyamides, poly(vinyl butyral), poly(vinyl alcohol), polyurethane and polyacrylonitrile. This layer is of a thickness of from about 0.001 micron to 1 micron. Optionally, this layer may contain conductive and nonconductive particles such as zinc oxide, titanium dioxide, silicon nitride, carbon black, and the like to provide, for example, in embodiments of the present invention desirable electrical and optical properties.

Aryl amines selected for the hole transporting layer which generally is of a thickness of from about 5 microns to about 75 microns, and preferably of a thickness of from about 10 microns to about 40 microns, include molecules of the following formula:

dispersed in a highly insulating and transparent organic resinous binder wherein X is an alkyl group or a halogen, especially those substituents selected from the group consisting of Cl and $CH_3$.

Examples of specific aryl amines are N,N'-diphenyl-N, N'-bis(alkylphenyl)- 1,1'-biphenyl-4,4'-diamine wherein alkyl is selected from the group consisting of methyl, ethyl, propyl, butyl, hexyl, and the like; N,N'-diphenyl-N,N'-bis(halophenyl)-1,1'-biphenyl-4,4'-diamine wherein the halo substituent is preferably chloro. Other known charge transport layer molecules can be selected, reference for example U.S. Pat. Nos. 4,921,773 and 4,464,450, the disclosures of which are totally incorporated herein by reference.

Examples of the highly insulating and transparent polymer binder material for the transport layers include materials such as those described in U.S. Pat. No. 3,121,006, the disclosure of which is totally incorporated herein by reference. Specific examples of polymer binder materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the transport layer contains from about 10 to about 75 percent by weight of the charge transport material, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

Specific embodiments of the invention will now be described in detail. These Examples are intended to be illustrative, and the invention is not limited to the materials, conditions, or process parameters set forth in these embodiments. All parts and percentages are by weight unless otherwise indicated.

EXAMPLE I

The following Example illustrates the preparation of Type III dihydroxygermanium phthalocyanine from Type ]: dihydroxygermanium phthalocyanine obtained from dichlorogermanium and diiminoisoindolene precursors.

A suspension of 280.0 grams of diiminoisoindolene in 1.5 liters of 1-chloronaphthalene was mechanically stirred in a 3 liter flask fitted with a thermometer, a mechanical stirrer and a water condenser under a nitrogen atmosphere. 100 Grams of germanium tetrachloride was slowly added to the suspension, and the resulting mixture was heated to reflux, and then maintained at this temperature for 2.5 hours. Subsequently, the reaction mixture was cooled to about 100° C., and filtered through a sintered glass funnel. The crude product was washed with five 100 milliliter portions of boiling dimethylformamide, then with 500 milliliters of methanol, and was dried in vacuo at 75° C. overnight, about 20 hours, yielding 61.4 grams of blue crystals of dichlorogermanium phthalocyanine.

25.0 Grams of dichlorogermanium phthalocyanine as prepared in accordance with the above procedure were added in small portions to 350 milliliters of concentrated sulfuric acid with continuous stirring over a period of 20 to 30 minutes. The resulting black solution was stirred at room temperature, about 25° C., for 4 hours, and was then poured slowly onto 2.0 kilograms of crushed ice over a period of about 1 hour. The precipitated blue dihydroxygermanium phthalocyanine product was filtered, washed twice with a dilute aqueous ammonium hydroxide solution, about 300 milliliters, and three to four times with water, about 300 milliliters, and dried in vacuo at 75° C. There resulted 24.2 grams of Type I dihydroxygermanium phthalocyanine. The Type I was stirred in suspension in 250 milliliters of mixed solvent comprised of 50 milliliters of trifluoroacetic acid and 200 milliliters of methanol for 1 hour at room temperature. It was then filtered and washed twice with methanol, and dried in vacuo at 75° C. to afford 23.9 grams of Type III dihydroxygermanium phthalocyanine, identified by its XRPD pattern.

EXAMPLE II

The following Example illustrates the preparation of Type III dihydroxygermanium phthalocyanine from Type II dihydroxygermanium phthalocyanine obtained from dichlorogermanium and diiminoisoindolene precursors.

Type II dihydroxygermanium phthalocyanine was prepared from dichlorogermanium and diiminoisoindolene in accordance with the procedure of Example I except that the dihydroxygermanium phthalocyanine product from the sulfuric acid reaction was washed several times with water as needed but to the extent that the filtrate of the washing did not exceed a pH of 1.0. Thereafter, the resulting pigment was washed with pyridine, and then stirred in methanol for an hour, filtered, washed with methanol, and dried in vacuo at 75° C. overnight, thereby affording Type III dihydroxygermanium phthalocyanine as blue crystals in over 90 percent yield based on the dichlorogermanium phthalocyanine intermediate.

EXAMPLE III

Another preparation of Type III dihydroxygermanium phthalocyanine starting from tetraethyoxygermanium and diiminoisoindolene precursors is as follows.

13.93 Grams of diiminoisoindolene and 6.30 grams of tetraethyoxygermanium were added to 80 milliliters of N-methyl pyrrolidone in a 250 milliliter flask fitted with a mechanical stirrer and a water condenser. The mixture was stirred and heated to reflux under a nitrogen atmosphere. The suspension dissolved as the heating proceeded, and a dark blue precipitate began to form at about 170° C. Thereafter, the reaction mixture was held at reflux temperature for 2.5 hours before it was cooled down to 150° C., and filtered. The blue precipitate was washed by slurrying in 100 milliliters of boiling dimethylformamide and filtered, and this washing was repeated twice. The blue precipitate was subsequently added to concentrated sulfuric acid, followed by washing with water, pyridine and then methanol in accordance with the procedure of Example II, yielding 10.12 grams of Type III dihydroxygermanium phthalocyanine after drying in vacuo at 75° C. for 24 hours.

EXAMPLE IV

A photoresponsive imaging member was fabricated by coating an aluminized MYLAR® substrate (3 mils) with a solution comprised of 6.5 grams of acetylacetonate tributoxyzirconium and 0.75 gram of (3-aminopropyl)trimethoxysilane in 28.5 grams of isopropanol and 14.3 grams of butanol using a wire wound rod applicator. The coated layer was dried at 140° C. for 10 minutes providing a dry thickness of 0.1 micron. A photogenerator pigment dispersion was prepared by milling a mixture of 0.56 gram of Type III dihydroxygermanium phthalocyanine obtained in Example I and 20.0 grams of 1.3 percent poly(vinyl butyral) in butyl acetate in a 60 milliliter jar containing 70 grams of glass beads (1 millimeter diameter) by means of a paint shaker for 2 hours. The dispersion was then coated onto the zirconium layer as prepared above using a wire wound rod applicator, and dried at 100° C. for 10 minutes thereby forming a photogenerator layer of a thickness of 0.19 micron. The hole transport layer was prepared by coating a solution of 5.4 grams of N,N'-diphenyl-N,N'-bis(3-methylphenyl)-1,1'-biphenyl-4,4'diamine and 8.1 grams of polycarbonate in 58.0 grams of chlorobenzene onto the photogenerator layer, and dried at 110° C. for 1 hour; the thickness of this layer was 28.5 microns.

The xerographic electrical properties of the imaging member was evaluated by electrostatically charging the surfaces thereof with a corona discharge source until the surface potential, as measured by a capacitively coupled probe attached to an electrometer, attained an initial value $V_0$ of about −800 volts. After resting for 0.5 second in the dark, the charged members attained a surface potential of $V_{ddp}$, dark development potential. The dark decay in volts/second was calculated as $(V_o-V_{ddp})/0.5$. The imaging member was then exposed to a monochromatic radiation of 780 nanometers to effect photoinduced discharge; a reduction in the surface potential from $V_{ddp}$ to a background potential ($V_{bg}$) was observed. The half-exposure energy, $E_{1/2}$, the exposure energy required to effect the reduction of the surface potential to half of $V_{ddp}$ was determined. For this imaging member, the dark decay was 21 volts/second and $E_{1/2}$ was 6.3 ergs/cm$^2$.

EXAMPLE V

A photoresponsive imaging member employing Type III dihydroxygermanium phthalocyanine obtained in Example II was fabricated in accordance with the procedure of Example IV. For this imaging member, the dark decay was 23 volts and the $E_{1/2}$ was 5.8 ergs/cm$^2$.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for the preparation of Type III dihydroxygermanium phthalocyanine consisting essentially of admixing dihalogermanium phthalocyanine or dialkoxygermanium phthalocyanine with a concentrated acid, followed by contact with water, and then washing with an organic base and an aprotic organic solvent, and wherein said Type III dihydroxygermanium phthalocyanine displays an X-ray powder diffraction pattern with peaks at Bragg angles (2°) of 8.0, and with peaks at Bragg angles (2°) of 8.0°, 8.7°, 10.9°, 12.1°, 12.8°, 15.0°, 16.0°, 16.7°, 17.3°, 17.7°, 18.3°, 18.4°, 19.8°, 21.5°, 22.5°, 23.0°, 24.7°, 25.6°, 27.5°, 28.8°, 30.0°, and 31.9.

2. A process for the preparation of Type III dihydroxygermanium phthalocyanine by direct polymorphic conversion from Type I dihydroxygermanium phthalocyanine by contacting a solvent mixture of an organic acid and aprotic organic solvent, followed by washing with said aprotic organic solvent, and wherein said Type III dihydroxygermanium phthalocyanine displays an X-ray powder diffraction pattern with peaks at Bragg angles (2°) of 8.0, and with peaks at Bragg angles (2°) of 8.0°, 8.7°, 10.9°, 12.1°, 12.8°, 15.0°, 16.0°, 16.7°, 17.3°, 17.7°, 18.3°, 18.4°, 19.8°, 21.5°, 22.5°, 23.0°, 24.7°, 25.6°, 27.5°, 28.8°, 30.0°, and 31.9.

3. A process for the preparation of Type III dihydroxygermanium phthalocyanine by direct polymorphic conversion from Type II dihydroxygermanium phthalocyanine by contacting said phthalocyanine with an aprotic solvent, followed by washing with said aprotic solvent, and drying, and wherein said Type III dihydroxygermanium phthalocyanine displays an X-ray powder diffraction pattern with peaks at Bragg angles (2°) of 8.0, and with peaks at Bragg angles (2°) of 8.0°, 8.7°, 10.9°, 12.1°, 12.8°, 15.0°, 16.0°, 16.7°, 17.3°, 17.7°, 18.3°, 18.4°, 19.8°, 21.5°, 22.5°, 23.0°, 24.7°, 25.6°, 27.5°, 28.8°, 30.0°, and 31.9, and wherein said aprotic solvent is an aliphatic alcohol containing from 1 to about 25 carbon atoms.

4. A process in accordance with claim 1 wherein the concentrated acid is sulfuric acid.

5. A process in accordance with claim 1 wherein the aprotic organic solvent is an aliphatic alcohol containing from 1 to about 25 carbon atoms.

6. A process in accordance with claim 2 wherein the concentrated acid is concentrated sulfuric acid, and the organic base is pyridine or trialkylamine.

7. A process in accordance with claim 2 wherein the aprotic organic solvent is an alcohol.

8. A process in accordance with claim 2 wherein the concentrated acid is sulfuric acid, and the aprotic organic solvent is an aliphatic alcohol containing from 1 to about 25 carbon atoms.

9. A process in accordance with claim 1 wherein the admixing with the concentrated acid is accomplished by adding dihalogermanium phthalocyanine or dialkoxygermanium phthalocyanine to the acid at a temperature ranging from 0° to about 50° C., followed by stirring for about 5 minutes to about 10 hours, and then mixing the resulting mixture with ice with continuous stirring, filtering, washing with a dilute aqueous ammonium hydroxide and water, and stirring in a mixed solvent of a concentrated acid and aprotic organic solvent in a ratio of from about 1 part to about 100 parts by volume to about 1 part to 2 parts by volume at room temperature for from about 5 minutes to about 1 hour, and wherein said aprotic organic solvent is an aliphatic alcohol with from 1 to about 25 carbon atoms.

10. A process in accordance with claim 1 wherein the treatment with concentrated acid is accomplished by adding dihalogermanium phthalocyanine or dialkoxygermanium phthalocyanine to the acid at a temperature ranging from 0° to about 50° C., followed by stirring for from about 5 minutes to about 10 hours, and subsequently pouring the mixture onto ice or into ice-cold water with continuous stirring, filtering and washing with water, and subsequently stirring in an organic base of pyridine or a trialkylamine, stirring in aprotic organic solvent and wherein the treatment with base and aprotic organic solvent is accomplished at room temperature for a duration of about 5 minutes to about 1 hour, and wherein said aprotic solvent is an aliphatic alcohol with from 1 to about 25 carbons.

11. A process in accordance with claim 2 wherein Type I dihydroxygermanium phthalocyanine is slurried in the solvent mixture of an organic acid of trifluoroacetic acid and an aprotic organic solvent at room temperature for from about 5 minutes to about 10 hours, with the ratio being 1 part of acid to 1 to 50 parts by volume of organic solvent, and wherein said aprotic organic solvent is an aliphatic alcohol with 1 to 25 carbon atoms.

12. A process in accordance with claim 3 wherein Type II dihydroxygermanium phthalocyanine is slurried in an aprotic organic solvent of the alcohol methanol for from about 5 minutes to about 10 hours at room temperature.

13. A process for the preparation of dihydroxygermanium phthalocyanine, polymorphic Type III consisting of reacting dihalogermanium phthalocyanine or dialkoxygermanium phthalocyanine with sulfuric acid, followed by admixing with water, washing with an aqueous base and water, and subsequently stirring in a mixed solvent of a strong organic acid of trifluoroacetic acid and aprotic organic solvent, followed by filtering, and drying, and wherein said aprotic organic solvent is an aliphatic alcohol with 1 to about 25 carbon atoms.

14. A process in accordance with claim 13 wherein the concentrated acid is trifluoroacetic acid and the aprotic organic solvent is an aliphatic alcohol with from 1 to about 25 carbon atoms.

15. A process in accordance with claim 3 wherein the organic acid is trifluoroacetic acid or trichloroacetic acid.

16. A process in accordance with claim 5 wherein the alcohol is methanol, ethanol, propanol, or butanol.

17. A process in accordance with claim 3 wherein the aprotic organic solvent is the alcohol, methanol, ethanol, propanol, or butanol; the organic acid is trifluoroacetic acid, trichloroacetic acid, an organic sulfonic acid of methane sulfonic acid or benzene sulfonic acid.

18. A process in accordance with claim 1 wherein the aprotic solvent is methanol, ethanol, propanol, or butanol.

19. A process in accordance with claim 2 wherein the aprotic solvent is methanol, ethanol, propanol, or butanol.

\* \* \* \* \*